Feb. 8, 1944. T. W. SOMERVILLE 2,340,997
VALVE MECHANISM
Filed Nov. 30, 1942
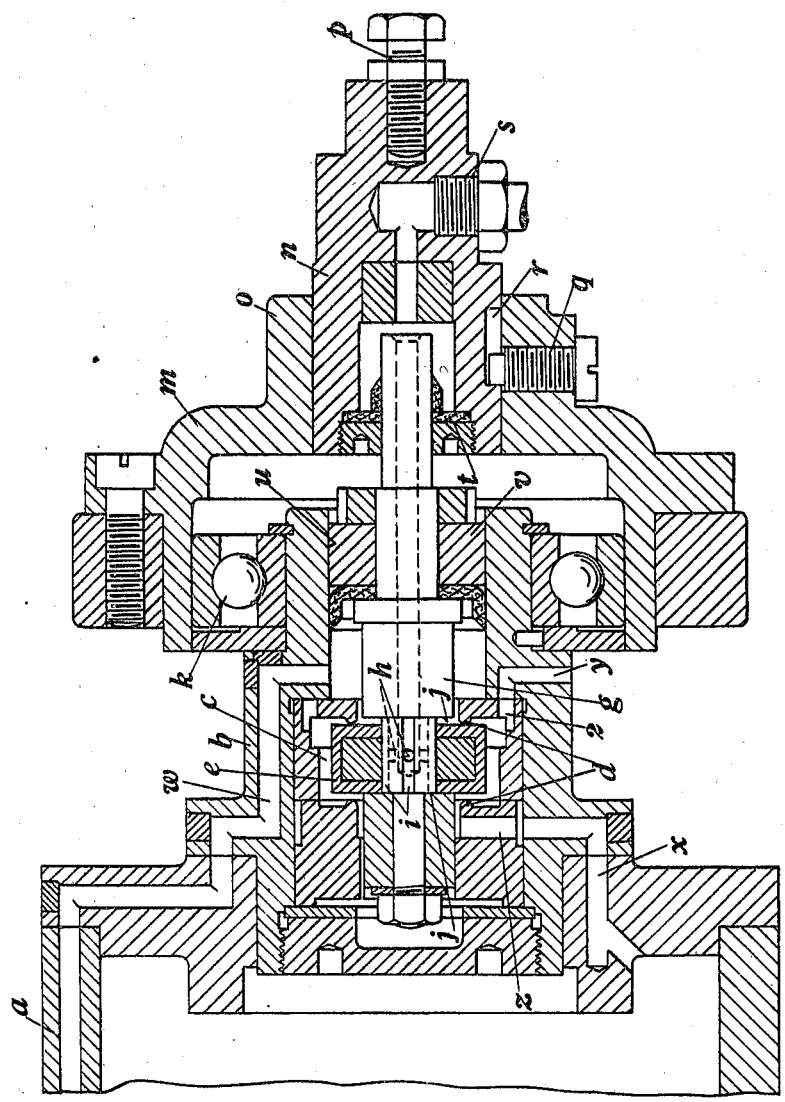
Inventors
T. W. Somerville, Dec'd
By W. Somerville, Executor
and
D. M. Blackburn
By Glascock Downing & Seebold Attys.

Patented Feb. 8, 1944

2,340,997

UNITED STATES PATENT OFFICE 2,340,997

VALVE MECHANISM

Thomas Wigley Somerville, deceased, late of Milliken Park, Scotland, by William Somerville, executor, Paisley, Scotland, and Donald Macpherson Blackburn, Johnstone, Scotland, assignors to A. C. Wickman Limited, Tile Hill, Coventry, England Application November 30, 1942, Serial No. 467,415
In Great Britain December 4, 1941

3 Claims. (Cl. 277—21)

This invention has for its object to provide an improved valve mechanism for controlling the flow of fluid (liquid or gas), and whilst the invention is primarily intended for controlling the actuation of pneumatically operated chucks on lathes and other machine tools it is applicable to other analogous uses.

The invention comprises the combination with a hollow body part having appropriate passages for the fluid, of a pair of fixed and coaxially arranged annular seatings, an axially movable closure member mounted coaxially between and having a pair of faces which can co-operate with the said seatings, an axially movable and coaxial hollow operating stem passing through the closure member and having openings adapted to communicate with opposite ends of the closure member, and a pair of annular seatings on the stem adapted to co-operate with the ends of the closure member, the arrangement being such that when the stem is moved in either direction it causes one of its seatings to make contact with one end of the closure member and the other end of the closure member to make contact with one of the fixed seatings, thus enabling pressure fluid to flow to and exhaust fluid to flow from the means to be actuated.

The accompanying drawing is a sectional elevation of valve mechanism constructed in accordance with the invention for controlling the admission of pressure fluid to and the discharge of exhaust fluid from the rotary cylinder of a pneumatically operated chuck for a lathe.

In the drawing $a$ indicates the rotary cylinder which contains a relatively slidable piston (not shown) for actuating the chuck mechanism under the action of pressure fluid supplied to either end of the cylinder.

In carrying the invention into effect as shown, we provide one end of the cylinder $a$ with an outwardly extending axial extension $b$ containing a chamber $c$, and we arrange in this chamber a pair of fixed and conveniently spaced annular seatings $d$, these being situated coaxially with the axis of the cylinder in planes at right angles to the cylinder axis. Between these two seatings $d$ is placed a coaxially arranged and axially movable closure member $e$ of annular form. This closure member $e$ has a pair of flat end faces, one of which can be moved into contact with one of the fixed seatings $d$ and the other into contact with the other fixed seating.

The closure member $e$ is carried on a coaxial and axially slidable hollow operating stem $g$. The portion of the stem $g$ on which the closure member $e$ is mounted is formed with radial holes $h$ and with longitudinal peripheral grooves $i$ by which pressure fluid can flow from the interior of the stem to the chamber $c$ at either end of the closure member. Further the stem $g$ is provided with a pair of suitably spaced shoulders forming annular seatings $j$ which can be caused to abut against the flat ends of the closure member $e$, the latter serving when in contact with either of the stem seatings to close the adjacent ends of the longitudinal fluid passages $i$ in the stem.

The cylinder extension $b$ is supported at its outer end by a ball or roller bearing $k$ in a fixed housing $m$, and the portion of the stem $g$ which extends beyond this bearing is enclosed by a hollow non-rotatable but slidable stem-actuating member $n$, the latter being supported by and arranged to extend through a bearing $o$ on the outer end of the housing, and being provided at its outer end with an adjustable abutment $p$ through which the stem-actuating member can be moved in one direction by a cam or other means (not shown). A screw $q$ passing radially through the bearing $o$ serves by engaging a longitudinal groove $r$ in the stem-actuating member $n$ to prevent rotational movement of this member without interfering with its sliding movement. The stem-actuating member $n$ is provided near its outer end with a lateral pipe connection $s$ by which pressure fluid can be admitted to its interior. Escape of fluid from the interior of the member $n$ past the adjacent end portion of the stem $g$ is prevented by a gland packing $t$ surrounding the stem. From the member $n$ the pressure fluid passes through the stem $g$ to the interior of the closure member $e$ and either end of the chamber $c$.

The outer end of the cylinder extension $b$, which lies within or is immediately adjacent to the bearing $k$, is formed with a cylindrical bore $u$ in which is slidably arranged a piston $v$ formed on or secured to the stem $g$, this piston being adapted to move the stem in the opposite direction to the stem-actuating member $n$ under the action of pressure fluid from the chamber $c$.

In the cylinder $a$ and its extension $b$ are formed three fluid passages $w$, $x$, $y$. The passage $w$ extends from the region at the outer side of the outer fixed seating $d$ to one end of the cylinder, this region being bounded at one side by the piston $v$ on the stem $g$. The passage $x$ extends to the other end of the cylinder $a$ from the inner fixed seating $d$, the latter being formed with a port or ports as $z$ in communication with this passage. The third passage $y$ communicates with a port 2 in the outer fixed seating d, and serves with this port to connect the region between the fixed seatings to the atmosphere.

Assuming that the mechanism above described is arranged as shown with its axis horizontal, and with the stem g in the right-hand limit position to which it has been moved by the fluid pressure acting on the stem piston v, the right-hand end of the closure member e bears against the right-hand fixed seating d and the left-hand stem seating j abuts against the left-hand end of the closure member. In this condition pressure fluid from the interior of the stem g can pass to one end of the cylinder a through the passage w, and exhaust fluid can be discharged to atmosphere from the other end of the cylinder through the passages x, y, thus causing the piston in the cylinder to be moved in the corresponding direction. To cause the said piston to move in the opposite direction, the stem actuating member n is moved to the left causing a like movement to be given to the stem g. By this movement, the right-hand stem seating j is caused to bear against the right-hand end of the closure member e and push the opposite end of the latter into contact with the left-hand fixed seating d. In this condition pressure fluid from the stem g can flow along passage x and exhaust fluid from the cylinder along passages w, y. On releasing the force acting on the stem-operating member n, the stem g returns to its initial position under the action of fluid pressure on the stem piston v.

As already stated the valve mechanism above described is combined with a rotary cylinder, but it will be readily understood that it is equally applicable to a stationary cylinder, and moreover that it can be applied to a variety of other analogous uses, subordinate details of construction or arrangement being variable to suit different requirements. Also instead of causing the pressure fluid to pass along the stem and the exhaust fluid along a passage in the body part containing the valve mechanism, the reverse arrangement may be employed, in which case, pressure fluid is admitted along the said passage and exhaust fluid is discharged through the stem.

Having thus described our invention what we claim as new and desire to secure by Letters Patent is:

1. For use in controlling the flow of pressure fluid to and exhaust fluid from fluid-operable means, valve mechanism comprising the combination of a hollow body part having a pair of passages through which fluid can flow to and from the said means, a chamber in the body part, a pair of fixed and coaxially arranged annular seatings through which the said passages can communicate with the chamber, a third fluid passage communicating with the chamber, an axially movable closure member mounted coaxially between and having a pair of faces which can co-operate with the said seatings, an axially movable and coaxial hollow operating stem which passes through the closure member and through which fluid can flow, the stem having openings adapted to communicate under the control of the closure member with the spaces surrounded by the seatings, and a pair of annular seatings provided on the stem and adapted to co-operate with the ends of the closure member for controlling communication between the said openings and spaces, the two pairs of seatings and the closure member being arranged so that when the stem is moved in either direction it causes one of its seatings to make contact with one end of the closure member and the other end of the closure member to make contact with one of the fixed seatings, thus establishing communication between one of the passages in the body part and the third passage, and between the other passage in the body part and the interior of the stem.

2. Valve mechanism as and for the purpose claimed in claim 1 and having combined with the stem a piston by which the stem can be moved in one direction by fluid pressure.

3. Valve mechanism as and for the purpose claimed in claim 1 and having in combination with the stem, a piston by which the stem can be moved in one direction by fluid pressure, and a hollow slidable member which encloses and communicates with one end of the stem, and by which movement in the opposite direction can be imparted to the stem, the said member being adapted to permit the flow of fluid through it.

WILLIAM SOMERVILLE,
*Executor of the Estate of Thomas Wigley Somerville, Deceased.*
DONALD MACPHERSON BLACKBURN.